United States Patent [19]

Nilssen

[11] Patent Number: 5,068,890
[45] Date of Patent: Nov. 26, 1991

[54] COMBINED SIGNAL AND ELECTRICAL POWER DISTRIBUTION SYSTEM

[76] Inventor: Ole K. Nilssen, Caesar Dr., Barrington, Ill. 60010

[21] Appl. No.: 562,897

[22] Filed: Aug. 6, 1990

Related U.S. Application Data

[63] Continuation-in-part of Ser. No. 397,266, Aug. 23, 1989, which is a continuation-in-part of Ser. No. 136,505, Dec. 23, 1987, Pat. No. 4,866,757, which is a continuation of Ser. No. 921,381, Oct. 22, 1986, abandoned.

[51] Int. Cl.$^5$ ............... H04M 11/00; H01B 7/00; H04Q 7/04
[52] U.S. Cl. ............... 379/90; 379/397; 379/58; 379/102; 307/147; 307/155
[58] Field of Search ............... 379/80, 102, 397, 387, 379/58, 457; 174/115; 307/147, 155, 146

[56] References Cited

U.S. PATENT DOCUMENTS

| | | | |
|---|---|---|---|
| 3,842,320 | 10/1974 | Kiesling | 307/155 |
| 4,533,790 | 8/1985 | Johnston et al. | 174/115 |
| 4,899,217 | 2/1990 | MacFadyen et al. | 307/147 X |
| 4,939,770 | 7/1990 | Makino | 379/58 X |

*Primary Examiner*—Stafford D. Schreyer

[57] ABSTRACT

In a combined telephone and electric power distribution system, both telephone signals and electric power are distributed by way of a common distribution system wherein signal conducting means (such as optical fibers) and electric power conducting means are routed alongside each other to/from various utilization points, such as to/from a telephone instrument, a computer, an electric lighting fixture and/or a power receptacle. At some of these utilization points, telephone signal receptacles are provided alongside electric power receptacles. At other points, the signal conducting means is terminated in a radio transceiver and wireless signal radiation/receiving means. In a typical situation, such a transceiver has its antenna mounted at or near a ceiling lighting fixture; which radio antenna interacts with some other transceiver combined with a telephone and/or other information-handling apparatus located nearby. In addition to being used for transmitting telephone and/or other information signals, the signal conducting means is used for controlling the flow and/or usage of electric power, such as control of light from individual lighting fixtures, for distributed protection against electrical circuit overload and/or fire hazards. Also included is a provision for supplying uninterruptible power to selected utilization points.

60 Claims, 5 Drawing Sheets

COMBINED SIGNAL AND ELECTRICAL POWER DISTRIBUTION SYSTEM

RELATED APPLICATIONS

This application is a Continuation-in-Part of Ser. No. 07/397,266 filed 08/23/89; which is a Continuation-in-Part of application Ser. No. 07/136,505 filed 12/23/87, now U.S Pat. No. 4,866,757 issued 09/12/89; which was a continuation of application Ser. No. 06/921,381 filed 10/22/86, now abandoned.

BACKGROUND OF THE INVENTION

1. Field of Invention

The present invention relates to a system for distributing telephone and other information-carrying signals along with electric power in a common distribution system.

2. Elements of Prior Art

Presently, within an office building or the like, telephone and other information-carrying signals are distributed by way of a network of telephone wires to various points of signal utilization, such as telephone instruments, fax machines, computer terminals, etc. In this same building, electric power is usually distributed by way of a separate network of steel-encased electric conductors to various points of utilization or control, such as wall switches, electric power receptacles, computer terminals, copying machines, lighting fixtures, etc.

Mainly for safety reasons, the two distribution networks are installed well apart from each other and treated as two entirely separate distribution systems. In fact, in view of the National Electrical Code and the requirements of Underwriters Laboratories Inc. (U.L.), it would simply not be permissible to combine in a common cable bunch conductors carrying ordinary 120 Volt/60 Hz power line voltage with telephone wires intended for connection with ordinary telephone instruments.

SUMMARY OF THE INVENTION

Objects of the Invention

An object of the present invention is that of providing an improved system for distributing electric power to various electric power utilization means as well as telephone and other information-carrying signals to various signal utilization means.

Another object is that of providing for a combination signal and electric power distribution system wherein one part of the signal distribution is accomplished by a signal conducting means positioned alongside a set of power distribution conductors and another part of the signal distribution is accomplished by wireless means.

Still another object is that of providing for a signal distribution system whereby a telephone apparatus may access, and/or be accessed from, this signal distribution system via any one of several points along a signal conducting means.

Yet another object is that of providing for a signal distribution system as described above wherein said access to and/or from said signal conducting means is accomplished via wireless signal radiation means.

These as well as other objects, features and advantages of the present invention will become apparent from the following description and claims.

Brief Description

In a building's system for distributing telephone and other information-carrying signals to various signal utilization means, as well as electric power to various electric power utilization means, such telephone and other information-carrying signals are distributed along with electric power in a common distribution system wherein a signal conduction means (such as ordinary telephone wires, coaxial cable and/or optical fibers) and electric power conduction means are routed alongside each other to/from various end points at which electric power is being utilized, such as to/from electric lighting fixtures, wall switches, power receptacles, etc. At some of these end points, telephone and/or other information signal receptacles are provided alongside electric power receptacles. At others of these end points, the signal conduction means is connected with a radio transceiver and/or wireless signal radiating/receiving means, such as a small two-way radio antenna mounted at or near a ceiling lighting fixture; which radio antenna would interact in two-way manner with a two-way antenna and/or transceiver means combined with a telephone and/or some other information-handling instrument located nearby.

In addition to being used for transmitting telephone and/or other information-carrying signals, the signal conduction means is used for controlling the flow and/or usage of electric power, such as to control the output of light from each individual lighting fixtures, to provide for distributed protection against electrical circuit overload and/or for prevention of fire initiation hazards, such as is presently attained by routing electric power conductors within steel conduits or armor.

In its ultimately preferred embodiment, the combination signal and power distribution system incorporates a special PBX (i.e., Private Branch Exchange) system so adapted as to make a given wireless telephone instrument operative automatically to access, and/or to be accessed from, the signal distribution part of the system by way of a small two-way antenna projecting into a room (as from one of the ceiling lighting fixtures) within which the given wireless telephone instrument is located. Thus, a person carrying this wireless telephone instrument will be able, automatically, to place and/or receive telephone calls wherever he might happen to be within a building (or within a system of buildings) wherein each room has a wireless connection or access point (such as via a small antenna on a ceiling lighting fixture) to the signal distribution part of the combined signal and power distribution system.

In its preferred embodiment, the present invention may be compactly described as follows.

In a building, such as an office building, a power and signal distribution system comprising:

(a) a central location whereat (i) at a signal terminal means, wireless and/or hard-wire connections are made with some external communications facility, such as a local telephone company; (ii) at a main power terminal means, connection is made with and unconditioned electric power is received from the local electric utility company; and (iii) at an auxiliary power terminal means, connection is made with and conditioned electric power is received from an auxiliary source of electric power, which auxiliary source of electric power may advantageously include a storage battery means;

(b) main power conduction means, such as a set of relatively heavy-gauge electric conductors, connected with the main power terminal means; the main power conduction means being routed, at least in part, along a path to a set of main power utilization points within or near the building;

(c) auxiliary power conduction means, such as a set of relatively light-gauge electric conductors, connected with the auxiliary power terminal means; the auxiliary power conduction means being routed, at least in part, alongside the main power conduction means to a set of auxiliary power utilization points within or near the building;

(d) signal conduction means, such as a set of optical fibres and/or telephone wires, connected with the signal terminal means; the signal conduction means being routed, at least in part, alongside the main power conduction means and/or alongside the auxiliary power conduction means to a set of signal utilization points within or near the building;

(e) a main power utilization means, such as an electric lighting fixture, connected with the main power conduction means at a first of said main utilization points and operative to be powered by unconditioned power provided therefrom;

(f) an auxiliary power utilization means, such as a computer terminal and/or a telephone instrument, connected with the auxiliary power conduction means at a first of said auxiliary utilization points and operative to be powered by conditioned power received therefrom;

(g) a first signal utilization means, such as a computer terminal and/or a telephone instrument, connected with the signal conduction means at a first of said signal utilization points and operative thereby to communicate with said external communications facility; and (h) a second signal utilization means, such as a first wireless transceiver means, connected with the signal conduction means at a second of said signal utilization points and operative thereby to communicate with said external communications facility as well as with a second wireless transceiver means located in the vicinity of the first wireless transceiver means.

DESCRIPTION OF INITIAL EMBODIMENT

Details of Construction of Initial Embodiment

Figure 1:
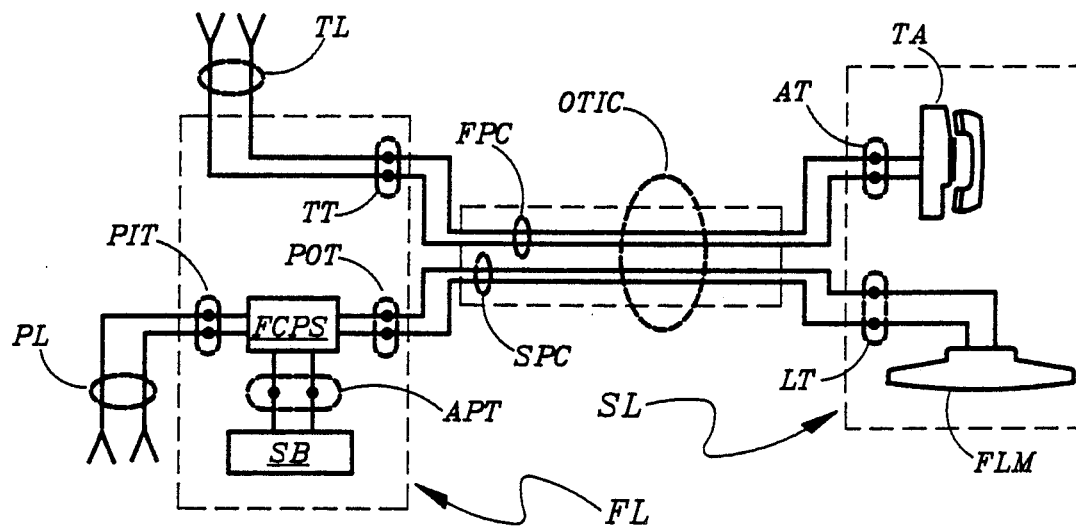
FIG. 1 provides an overall schematic view of a simple initial embodiment of the present invention.

FIG. 1 illustrates the overall arrangement of an initial simple embodiment of the present invention.

In FIG. 1, a telephone line TL and a power line PL both come into a first location FL and connect with a pair of telephone terminals TT and a pair of power input terminals PIT, respectively.

A frequency-converting power supply FCPS is connected with power input terminals PIT, and provides its output at power output terminals POT. A storage battery SB is connected with frequency-converting power supply FCPS by way of a pair of auxiliary power terminals APT.

At a second location SL, a telephone apparatus has a pair of apparatus terminals AT; and a fluorescent lighting means FLM has a pair of lighting terminals LT.

An ordinary telephone installation cable OTIC has a first pair of conductors FPC and a second pair of conductors SPC. The first pair of conductors is connected between telephone terminals TT and apparatus terminals AT; and the second pair of conductors is connected between power output terminals POT and lighting terminals LT.

Figure 2:
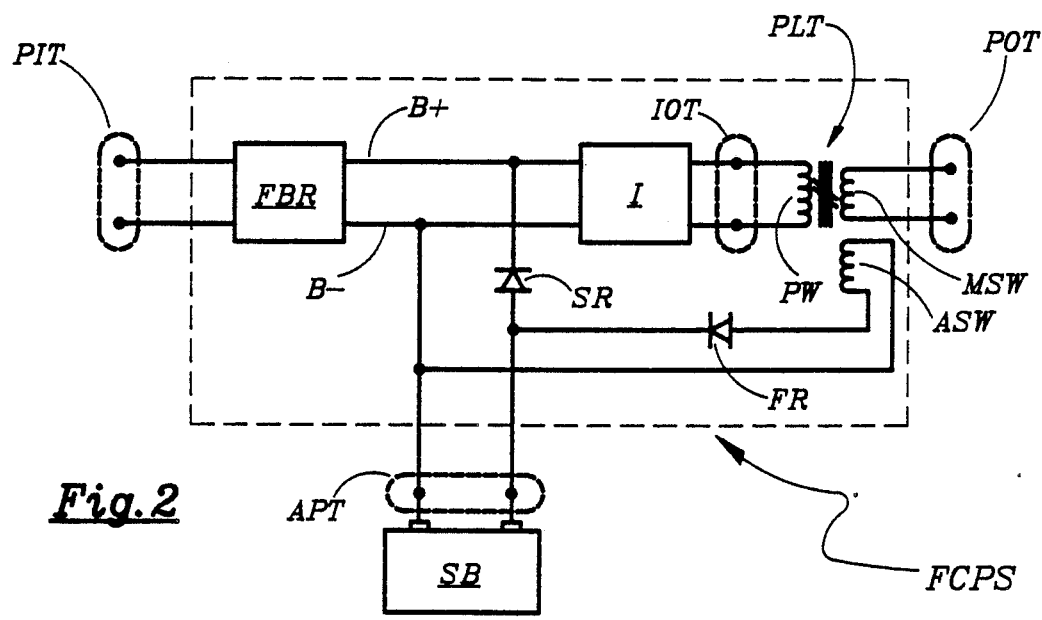
FIG. 2 provides details in respect to the frequency-converting power supply used in the embodiment of FIG. 1.

FIG. 2 provides details of frequency-converting power supply FCPS and its relationship with storage battery SB.

In FIG. 2, a full bridge rectifier FBR is connected with power input terminals PIT and provides its rectified output voltage between a B+ bus and a B− bus. An inverter I is connected with the B+ bus and the B− bus, and provides an AC voltage at inverter output terminals IOT. A power-limiting transformer PLT has a primary winding PW connected across inverter output terminals IOT, a main secondary winding MSW connected with power output terminals POT, and an auxiliary secondary winding ASW connected between the B− bus and the anode of a first rectifier FR, whose cathode is connected with the anode of a second rectifier SR. The cathode of second rectifier SR is connected with the B+ bus.

Auxiliary power terminals APT are connected with the negative and positive terminals of storage battery SB in such manner that the negative terminal connects with the B− bus and the positive terminal connects with the anode of second rectifier SR.

Figure 3:
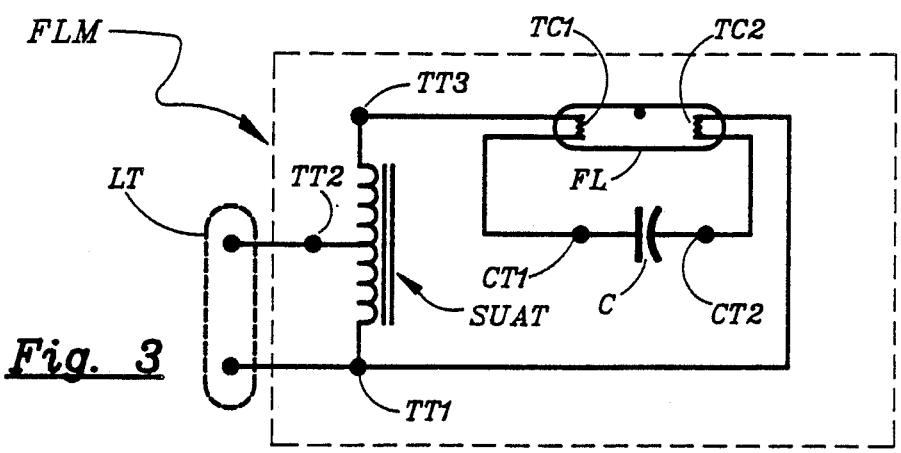
FIG. 3 provides details in respect to the fluorescent lighting means used in the embodiment of FIG. 1.

FIG. 3 provides details of fluorescent lighting means FLM.

In FIG. 3, a step-up auto-transformer SUAT has three transformer terminals TT1, TT2 and TT3. Transformer terminals TT1 and TT2 are connected with lighting terminals LT. Transformer terminal TT3 is connected with a first capacitor terminal CT1 of a capacitor C by way of a first thermionic cathode TC1 of a fluorescent lamp FL. A second capacitor terminal CT2 of capacitor C is connected with transformer terminal TT1 by way of a second thermionic cathode TC2 of fluorescent lamp FL.

Details of Operation of Initial Embodiment

With reference to FIGS. 1–3, the operation of the simple initial embodiment of the invention may be explained as follows.

With frequency-converting power supply FCPS connected with an ordinary 120 Volt/60 Hz power line, a 30 kHz squarewave voltage is provided at inverter output terminals IOT.

The output provided at power output terminals POT is also a 30 kHz voltage. However, due to internal magnetic leakage between primary and secondary windings in power-limiting transformer PLT, the maximum amount of current available from the POT terminals is manifestly and non-dissipatively limited. In particular, the output from the POT terminals is inductively limited in such manner as to meet the specifications in the National Electrical Code for Class-2 electrical circuits.

The output from the POT terminals is connected with a pair of conductors (SPC) in the more-or-less ordinary telephone installation cable OTIC. The telephone line is also connected with a pair of conductors (FPC) in cable OTIC. Thus, both Class-2 electric power as well as ordinary telephone signals are transmitted between the first location (FL) and the second location (SL) by way of an ordinary telephone installation cable (OTIC).

The first location would typically be some central location within a building; and the second location would typically be a telephone booth located some distance away from this building. However, the two locations might also both be located within a single building.

As long as the frequency-converting power supply (FCPS) is being powered by power line voltage from the power line (PL), the storage battery (SB) is being charged from the auxiliary secondary winding (ASW) on the power-limiting transformer (PLT). In the event of power failure, the inverter (I) will be powered from the storage battery; the voltage on which has a magnitude about half that existing between the B+ bus and the B— bus whenever power line voltage is present. Whenever the inverter is being powered by the storage battery, the magnitude of the voltage provided by the ASW winding is too low to cause battery charging.

The 30 Volt/30 kHz voltage provided by the FCPS power supply is transmitted to the fluorescent lighting means (FLM) in the second location (SL), thereby to provide illumination as might be useful in connection with using the telephone apparatus (TA).

In the fluorescent lighting means (FLM), the step-up auto-transformer (SUAT) receives the 30 Volt/30 kHz inductively current-limited voltage from the POT terminals of the FCPS power supply and transforms it to a 100 Volt/30 kHz inductively current-limited voltage. In combination with capacitor C, this 100 Volt/30 kHz inductively current-limited voltage is appropriate for starting and powering the fluorescent lamp (FL) by way of series-resonant action.

Additional Comments Regarding Initial Embodiment (a) For further details in respect to frequency-converting power supplies and series-resonant ballasting circuits for fluorescent lamps, reference is made to U.S. Pat. No. Re. 31,758 to Nilssen and U.S. Pat. No. 3,710,177 to Ward.

(b) The series-resonant ballasting circuit described by Ward is especially suitable for powering a fluorescent lamp over a wide range of different driving voltage magnitudes. In particular, reducing the driving voltage magnitude by a factor of two, reduces the lamp light output by less than a factor of two.

(c) If it should happen that the distance between the first location (FL) and the second location (SL) is more than about 100 feet, it is advantageous to reduce the frequency of the driving voltage provided by the frequency-converting power supply (FCPS). In particular, for very large distances, it is anticipated that frequencies as low as 1 kHz may be used.

(d) The maximum amount of power available from the power output terminals (POT) of the frequency-converting power supply (FCPS) is 100 Watt; which is the maximum amount permissible for Class-2 electrical circuits in accordance with the National Electrical Code.

(e) It is expected that, in addition to use in connection with telephone booths and the like, the combined telephone and distribution system of FIG. 1 will find use in homes, offices, and the like; and that both telephone signals and Class-2 electric power will be available by way of ordinary telephone-type receptacle means. In particular, it is anticipated that the output from the frequency-converting power supply (FCPS) be provided at the point in a building from which the telephone signals are distributed, thereby to provide for both telephone signals as well as Class-2 electric power to be distributed by way of a common ordinary multi-conductor telephone cable to multiple locations within the building: typically to the locations where telephone instruments are located.

(f) The National Electrical Code is established by National Fire Protection Association, Batterymarch Park, Quincy, MA 02269. Its presently most up-to-date version is provided in a book entitled NATIONAL ELECTRICAL CODE 1984; which book is published by National Fire Protection Association. By reference, this book in general, and Article 725 thereof in particular, is herewith made part of this patent specification.

(g) Article 725 of the National Electrical Code deals with power-limited circuits; which power-limited circuits are designated Class-1, Class-2, and Class-3 circuits.

Class-2 circuits refer to electrical circuits wherein: i) the maximum voltage available from or within the circuit is low enough in magnitude to be substantially free from electrical shock hazard to a person coming in direct electrical contact with terminals and/or other elements of the circuit, and ii) the maximum power available from or within the circuit is low enough to be substantially free of fire initiation hazard in case of an electrical malfunction, such as a short circuit.

Class-3 circuits refer to electrical circuits wherein: i) the maximum magnitude of any voltage available from or within the circuit is not higher than 150 Volt, and ii) the maximum power available from or within the circuit is low enough to be substantially free of fire initiation hazard in case of an electrical malfunction, such as a short circuit.

Under most conditions, the continuously available Volt-Ampere product from a Class-2 or Class-3 electrical circuit must be limited to a maximum of 100 Volt-Ampere; which means that the power available is correspondingly limited to a maximum of 100 Watt.

(h) The output from the frequency-converting power supply (FCPS) of FIGS. 1 and 2 is limited in accordance with the specifications in the NATIONAL ELECTRICAL CODE 1984 for Class-2 circuits; which means that it also complies with the specifications for Class-3 electrical circuits. Thus, under most conditions, the Volt-Ampere product available from the POT terminals of the FCPS power supply on a continuous basis may be as high as, but will not exceed, 100 Volt-Ampere.

As indicated in FIG. 2, limitation of Volt-Ampere product output is attained by providing for manifest magnitude-limitation on available output current; which manifest magnitude-limitation is attained by providing for less than 100% coupling between primary winding PW and main secondary winding MSW on power—limiting transformer PLT. Thus, current magnitude-limitation is attained by non-resistive or non-dissipative means.

(i) It is anticipated that glass or optical fiber means may be used instead of ordinary electrical conductors for providing telephone signal transmission between the first location (FL) and the second location (SL); in which case the OTIC cable of FIG. 1 would consist of optical fiber means in combination with electrical conductor means.

Thus, alternatively, the pair of lines labeled FPC in FIG. 1 represent an optical fiber means.

(j) The amount of power provided to the fluorescent lighting means (FLM) of FIGS. 1 and 3, is about 40 Watt.

Thus, the amount of power transmitted by way of the electric power transmission path (namely the SPC conductors of FIG. 1) is on the order of many Watt. On the other hand, the amount of power transmitted by way of the telephone transmission path (namely the FPC conductors of FIG. 1) is only on the order of a small fraction of one Watt.

(k) To minimize power losses and/or to permit longer transmission distances, it is anticipated that the SPC conductors of the OTIC cable be made of two or more parallel-connected pairs of the multiple individual conductors present in an ordinary telephone installation cable, or—alternatively—be made of heavier gauge conductors.

(1) In addition to, or instead of, the fluorescent lighting means (FLM) in FIG. 1, other electric power utilization means may be employed.

Similarly, in addition to, or instead of, the telephone apparatus (TA) of FIG. 1, other telephone signal utilization means may be employed.

For instance, the second location (SL) may harbor a computer terminal connected with the telephone signal transmission means (namely the FPC condustors) as well as with the electric power transmission means (namely the SPC conductors). That way, information transfer may take place by way of the telephone signal transmission means, and Class-2 electrical power transmission for operation of the computer terminal may be provided by way of the electric power transmission means.

(m) A telephone utility signal line is herewith defined as that set of electrical conductors, fiber optic means, or radio link means, used for transmitting telephone and/or similar signals between the location of a telephone company's facility and the location of a telephone customer.

(n) The amount of electric power available from a telephone utility signal line is on the order of milli-watts.

(o) The amount of electric power available from an ordinary electric power line in a home or office, as by way of an ordinary electric wall receptacle means, is on the order of kilo-watts.

(p) There is no inherent reason for the magnitude of the power transmitted along-side the telephone utility signal line be limited to 100 Watt. Clearly, by providing for other means for fire-initiation protection, larger amounts of power may safely be provided.

(q) It is emphasized that the telephone utility signal line may be used for communications relative to the power being provided therealongside. Thus, for instance, a signal may be generated indicating the magnitude of the current being drawn by the load (or each load); and this signal may be transmitted to the source of power and used to compare the magnitude of the current drawn by the load versus the magnitude of the current being provided from the source. Then, if there be any substantive difference therebetween, potential fire hazard may be indicated (as from an unauthorized load, such as a partial short circuit); and protective measures—such as circuit interruption—could be implemented.

(r) A basic concept herein disclosed in that of transmitting conditioned electric power alongside a telephone utility signal line, thereby to provide for a substantive amount of electric power at or near the point of utilization of the telephone signal. A corollary concept is that of transmitting information alongside a power transmission line; in which case information can be transmitted back relative to the utilization of the electric power. In either case, however, because of the immense ratio in magnitude difference between the power level associated with the electric power transmitted and the power level associated with the information signal transmitted, a high degree of separation is needed between the signal transmitting means and the power transmitting means. Consequently, due to the immense differences in transmission frequencies, to attain a high degree of electro-magnetic separation, a fiber optic line would be a particularly suitable signal communication means to be used alongside a power transmitting line.

DESCRIPTION OF THE PREFERRED EMBODIMENT

Details of Construction of the Preferred Embodiment

Figure 4A:
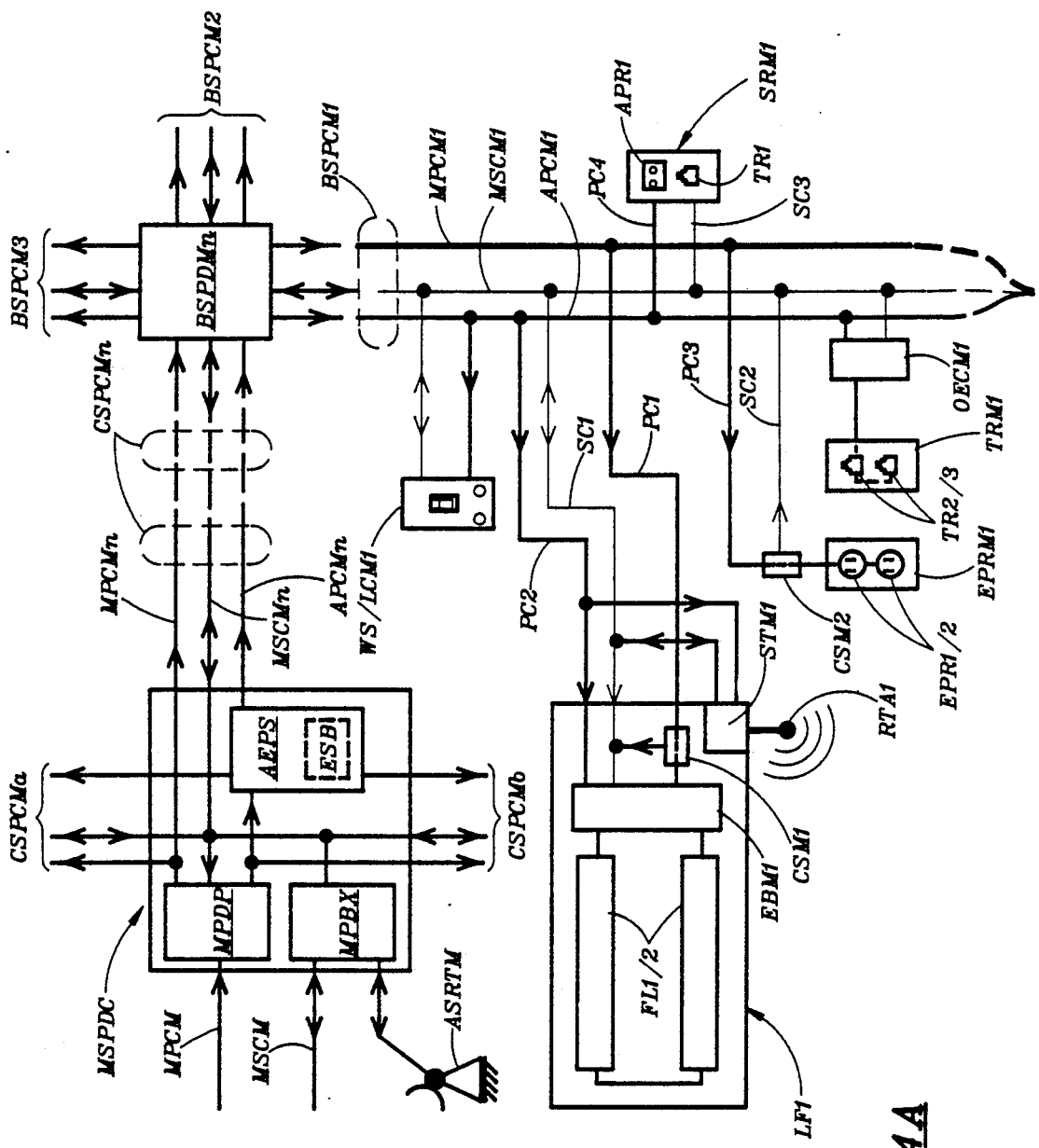
FIG. 4 provides an overall schematic system diagram of the preferred embodiment of the present invention.
Figure 4B:
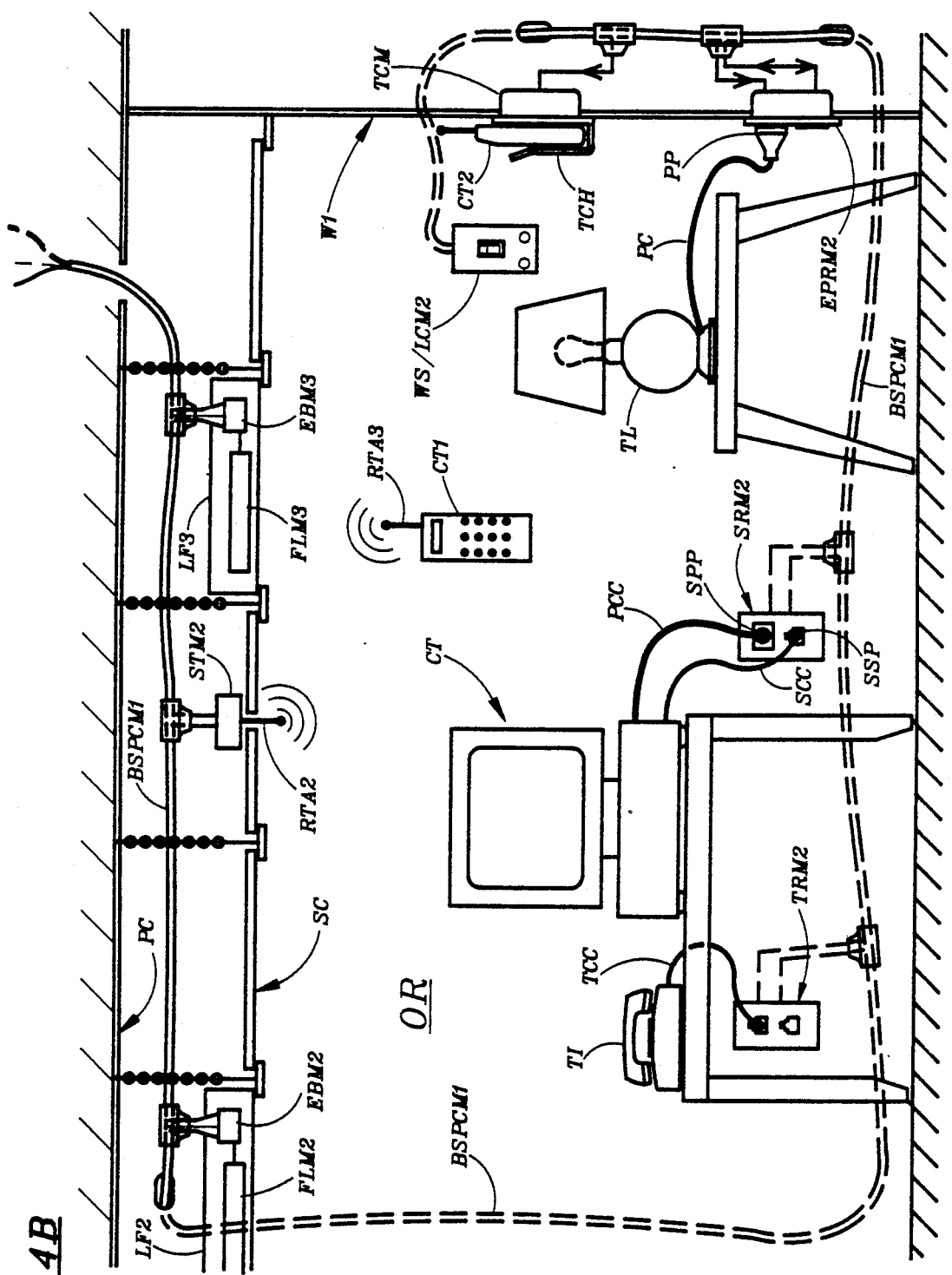

FIG. 4 schematically illustrates the preferred embodiment of the present invention. In FIG. 4, power from a local electric utility company is provided via main power conducting means MPCM (which may consist of two or more conductors transmitting single or multi-phase power) to main power distribution panel MPDP of main signal and power distribution center MSPDC. Main signal conducting means MSCM provides for signal transmission between a main private branch exchange MPBX and the local telephone utility company. Also connected with main private branch exchange MPBX is an external auxiliary signal receiving and transmitting means ASRTM; which might be a so-called microwave link.

Connected with main power distribution panel MPDP is an auxiliary electric power source AEPS; which includes an electric storage battery ESB.

Several sets of combined signal/power conducting means, CSPCMa, CSPCMb, and CSPCMn, are connected with main signal and power distribution center MSPDC. Each of these sets has a main power conducting means (ex: MPCMn) connected with main power distribution panel MPDP, a main signal conducting means (ex: SCMn) connected with main private branch exchange MPBX, and an auxiliary power conducting means (ex: APCMn) connected with auxiliary electric power source AEPS.

Combined signal/power conducting means CSPCMn connects with a branch signal/power distribution means BSPDMn; which, in turn, is connected with plural sets of branch signal/power conducting means BSPCM1, BSPCM2 and BSPCM3. Branch signal/power conducting means BSPCM1 comprises main power conducting means MPCM1, main signal conducting means MSCM1 and auxiliary power conducting means APCM1. Branch signal/power conducting means BSPCM1 then connects with various signal and-/or power utilization and/or control means, as follows.

A wall switch and light control means WS/LCM1 is connected with main signal conducting means MSCM1 and auxiliary power conducting means APCM1.

A lighting fixture LF1 has two fluorescent lamps FL1/2 which are series-connected across the output of an electronic ballasting means EBM1; which is connected with: (i) main power conducting means MPCM1 via power conductor PC1, which runs through current sensing means CSM1; (ii) main signal conducting means MSCM1 via signal conductor SC1, which is connected with current sensing means CSM1; and (iii) auxiliary power conducting means APCM1 via power conductor PC2.

A signal transceiver means STM1, which is incorporated into lighting fixture LF1, is connected with power conductor PC2 and signal conductor SC1. It has a receive/transmit antenna RTA1 projecting out from the body of the lighting fixture.

An electric power receptacle means EPRM1 is connected with main power conducting means MPCM1 via a power conductor PC3; which power conductor PC3 runs through a current sensor means CSM2; which current sensor means, in turn, is connected with main signal conducting means MSCM1 via a signal conductor SC2. Electric power receptacle means EPRM1 has electric power receptacles EPR1/2; each of which is operative to receive and hold an ordinary electric power plug.

A special receptacle means SRM1 is connected with auxiliary power conducting means APCM1 and main signal conducting means MSCM1 via power conductor PC4 and signal conductor SC3, respectively. Special receptacle means SRM1 has an auxiliary power receptacle APR1 and a telephone receptacle TR1.

A telephone receptacle means TRM1 is connected with main signal conducting means MSCM1 via an opto-electronic converter means OECM1; which, in turn, is connected with auxiliary power conducting means APCM1. Telephone receptacle means TRM1 has two telephone receptacles TR2/3; each of which is operative to receive and hold an ordinary telephone plug.

A suspended ceiling SC is suspended below a permanent ceiling PC, and branch power/signal conducting means BSPCM1 is located in the space between. Below the suspended ceiling is an office/room OR.

Mounted in the suspended ceiling are lighting fixtures LF2 and LF3, which comprise fluorescent lighting means FLM2 and FLM3 as well as electronic ballasting means EBM2 and EBM3, all respectively. Electronic ballasting means EBM2 and EBM3 are each connected with main power conducting means MPCM1, main signal conducting means MSCM1, and auxiliary power conducting means APCM1 of branch signal/power conducting means BSPCM1.

Also mounted in the suspended ceiling is a signal transceiver means STM2, which has a receive/transmit antenna RTA2 protruding into office/room OR. Signal transceiver means is connected with main signal conducting means MSCM1 as well as auxiliary power conducting means APCM1 of branch signal/power conducting means BSPCM1.

Located somewhere in office/room OR is a cordless telephone CT1 with a receive/transmit antenna RTA3; and positioned into a telephone charger-holder TCH, which is mounted on a wall W1, is a cordless telephone CT2. Telephone charger-holder TCH includes a telephone charging means TCM, which is connected with auxiliary power conducting means APCM1 of branch signal/power conducting means BSPCM1.

An electric power receptacle means EPRM2 is connected with main power conducting means MPCM1 as well as with main signal conducting means MSCM1 of branch signal/power conducting means BSPCM1. A table lamp TL has a power cord PC with a power plug PP plugged into electric power receptacle means EPRM2.

A wall switch and light control means WS/LCM2 is connected with main signal conducting means MSCM1 and auxiliary power conducting means APCM1 of branch signal/power conducting means BSPCM1.

A computer terminal CT has a signal connection cord SCC and a power connection cord PCC having, respectively, a special signal plug SSP and a special power plug SPP. These two plugs are plugged into a special receptacle means SRM2; which, in turn, is connected with main signal conducting means MSCM1 and auxiliary power conducting means APCM1 of branch signal/power conducting means BSPCM1.

A telephone instrument TI is connected via a telephone connect cord TCC with a telephone receptacle of a telephone receptacle means TRM2; which, in turn, is connected with main signal conducting means MSCM1 and auxiliary power conducting means APCM1 of branch signal/power conducting means BSPCM1.

Figure 5:
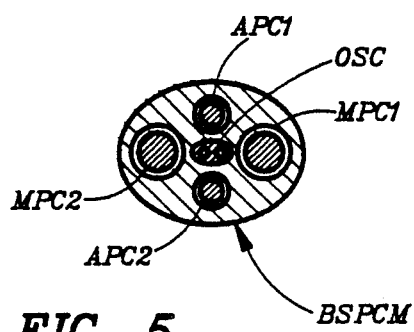
FIG. 5 shows a section of the combined main power, auxiliary power, and signal conduction means.

FIG. 5 shows a cross-section of a branch signal/power conducting means BSPCM (such as BSPCM1), particularly indicating a pair of main power conductors MPC1 and MPC2, a pair of auxiliary power conductors APC1 and APC2, and an optical signal conductor OSC.

Figure 6:
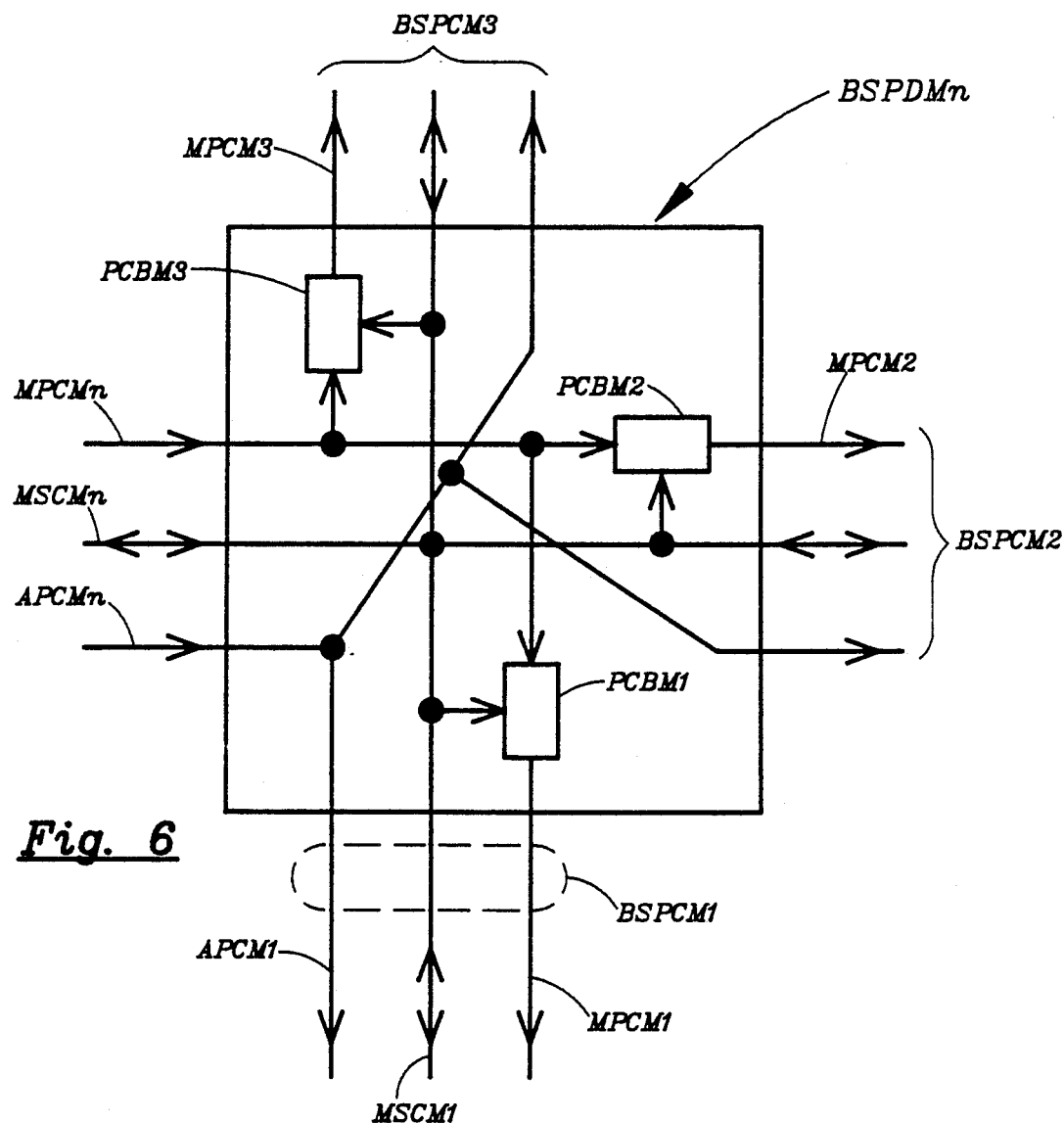
FIG. 6 schematically illustrates details near a branch point of subject combined power and signal distribution system.

FIG. 6 shows key details of branch signal/power distribution means BSPDMn, particularly indicating that main power conductor means MPCMn connects with main power conducting means MPCM1 by way of a programmable circuit breaker means PCBM1; which programmable circuit breaker means is connected with main signal conducting means MSCM1. Otherwise, auxiliary power conducting means APCMn is shown to be directly connected with auxiliary power conducting means APCM1, and main signal conducting means MSCMn is shown to be directly connected with main signal conducting means MSCM1. Main power conducting means MPCM2 and MPCM3 connect with main power conducting means MPCM by way of programmable circuit breaker means PCBM2 and PCBM3, respectively.

Figure 7:
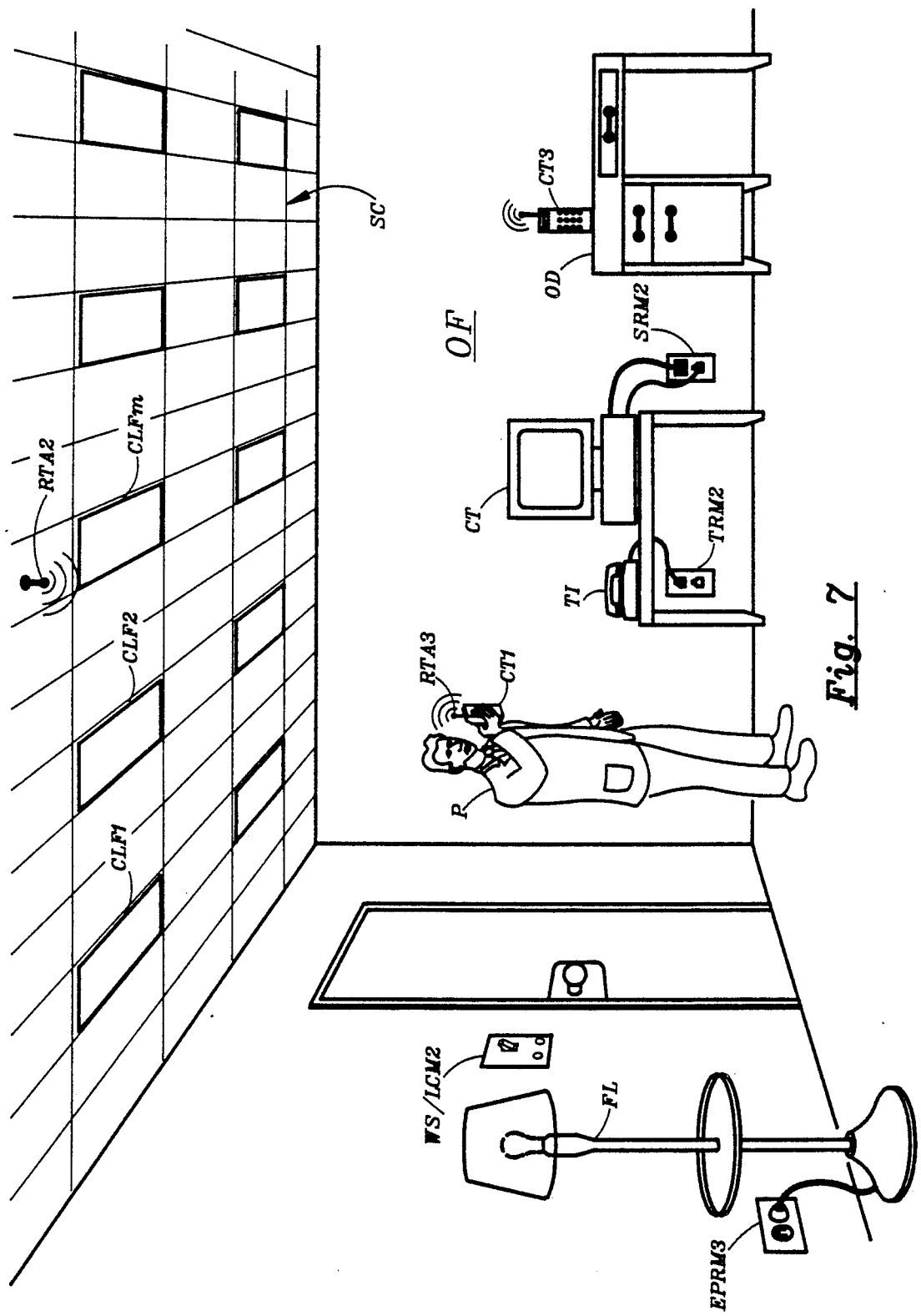
FIG. 7 shows key features of the present invention by way of a perspective view of plural rooms in a building with power and signal distribution system in accordance with the preferred embodiment of the present invention.

FIG. 7, in a perspective view, illustrates how the system of FIG. 4 might appear in an office OF in which a person P is holding cordless telephone CT1 with receive/transmit antenna RTA3; which connects via wireless means with receive/transmit antenna RTA2; which connects with signal transceiver means STM2 (located above suspended ceiling SC, as in FIG. 4) and which protrudes from the ceiling into office OF.

Otherwise, the office has numerous ceiling lighting fixtures CLF1, CLF2 . . . CLFm; which are controlled from wall switch and light control means WS/LCM2. Another cordless telephone CT3 is shown standing on an office desk OD; computer terminal CT is shown to connect with special receptacle means SRM; telephone instrument TI is shown connected with telephone receptacle means TRM2; and electric power receptacle means EPRM3 is shown powering a floor lamp FL.

Details of Operation of the Preferred Embodiment

In the combined signal and power distribution system of FIG. 4, at the main signal and power distribution center (MSPDC), electric power from the local electric utility is received at main power distribution panel MPDP via main power conducting means MPCM. The main signal conducting means (MSCM) provides for connection between the local telephone company and the main private branch exchange (MPBX); which is also connected with the auxiliary signal receive/transmit means (ASRTM) via which telephone and other signals are interchanged with some remotely located wireless receive/transmit means (not shown).

Within the main signal/power distribution center (MSPDC), the auxiliary electric power source (AEPS), which is connected with and powered from the main power distribution panel (MPDP), provides conditioned electric power to its three separate outputs, one of which is connected with auxiliary power distribution means AEPDMn. This conditioned electric power is similar to the unconditioned electric power received from the local electric utility company, except that it continues to be provided even during periods where delivery of electric power from the local electric utility company is interrupted; during which periods the conditioned electric power is derived from the electric storage battery (ESB) by way of a voltage conditioner means; which storage battery is charged by power derived from the local electric utility company during periods other than those associated with interruption in power delivery therefrom.

From the main signal/power distribution center, main electric power from the main power distribution panel as well as auxiliary electric power from the auxiliary electric power source are distributed to plural branch signal/power distribution means, such as via common signal/power conducting means CSPCMn to branch signal/power distribution means BSPDMn. Also, the various branch signal/power distribution means (such as BSPDMn) are each connected with the main signal/power distribution center (MSPDC) via a main signal conducting means (such as MSCMn).

From each branch signal/power distribution means (ex: BSPDMn), main electric power is distributed to its associated main power conducting means (ex: MPCM1) via a programmable circuit breaker means (ex PCBM1). This programmable circuit breaker means is operative to interrupt the flow of power in its associated main power conducting means (ex: MPCM1) in response to information received via main signal conducting means MSCM; which carries the same information signals as do the other main signal conducting means (ex: MSCM1).

More particularly, using PCBM1 as an example, the programmable circuit breaker means operates as follows: (i) it senses the magnitude of the current flowing through it (i.e., the current delivered to its associated main power conducting means MPCM1) and derives an internal electrical measure for that magnitude; (ii) it receives information via the main signal conducting means (MSCM1) with respect to the magnitude of the current drawn by each of the loads connected with its associated main power conducting means (MPCM1); (iii) it compares its own measure of the current flowing through it with the sum of the magnitudes of the currents drawn by the various loads connected to its associated main power conducting means (MPCM1); and (iv) if the result of this comparison shows that more current is flowing through circuit breaker means PCBM1 than is accounted-for by the various loads powered through it, it acts to interrupt the flow of current to its associated main power conducting means. Thus, if an unauthorized load (such as an accidental short circuit) were to be connected with a given main power conducting means (ex: MPCM1), its associated programmable circuit breaker (PCBM1) would sense it and act to interrupt the supply of current to that given main power conducting means.

In other words, each of the various loads (ex: lighting fixture LF1) properly connected with a given main power conducting means (MPCM1) draws its power via a current sensing means (CSM1); which current sensing means is connected to a nearby main signal conducting means (MSCM1) and, via this signal conducting means, transmits information to the associated programmable circuit breaker means (PCBM1) with respect to the magnitude of the current flowing through it, thereby to provide to the associated programmable circuit breaker means information with respect to the (instantaneous) magnitude of each individual one of the various loads properly connected with the associated main power conducting means.

As a consequence of providing-for the above-indicated auditing and control of the current provided to the various loads served via a given programmable circuit breaker means, there is much reduced need for protecting the main power conducting means by mechanical armor, such as steel conduit. This is so for the reason that the above-described system prevents any substantial amount of power from being dissipated by way of an unauthorized load. Thus, an accidental short circuit of a main power conducting means is effectively prevented from constituting a fire initiation hazard.

In effect, except to the degree that power is being extracted via a proper current sensing means (ex: CSM1), each main power conducting means may be considered as a so-called Class-3 electrical circuit (which, according to the definitions of the National Electric Code, means that the maximum power available from it on a continuous basis must not exceed 100 Watt) and therefore substantially safe from fire initiation hazard.

Clearly, to meet the specifications of Class-3 electrical circuits, the sensitivity of each programmable circuit breaker means should be such as to act to interrupt the flow of current at some point before unauthorized power drain exceeds 100 Watt.

In subject combined signal and electric power distribution system, power is delivered to plural lighting fixtures (ex: LF1) mounted in a suspended ceiling (SC). Each of these lighting fixtures is connected both with its nearby main power conducting means (MPCM1) as well as with its nearby main signal conducting means (MSCM1); however, each of at least some of these lighting fixtures is also connected with its nearby auxiliary power conducting means. With respect to each of these latter lighting fixtures, the associated electronic ballasting means (ex: EBM1 in lighting fixture LF1) is so designed and constructed as to be operative to be powered from its associated auxiliary power conducting means (APCM1) during periods when the supply of power from its associated main power conducting means (MPCM1) is interrupted, thereby to continue to provide light output even during periods of main power failure.

Also, in at least some of the lighting fixtures, the ballasting means is so designed and constructed as to be able to receive instructions in the form of signals from from its associated main signal conducting means and to adjust the level of its light output in accordance with those instructions. More particularly, via a central switch and control means (ex: WS/LCM1), at least some of the lighting fixtures may be switched ON and OFF, as well as having its light output level adjusted, by way of signals transmitted from this central switch and control means to these lighting fixtures by way of the main signal conducting means.

Otherwise, power is delivered on a continuous basis from the auxiliary electric power source (AEPS), via the auxiliary power conducting means (such as via APCM1), to various loads for which power interruption would be particularly disadvantageous, such as computers (ex: CT) and telephone instruments (ex: TI). Although not shown (for the purpose avoiding unnecessary complexities in the drawings), the delivery of electric power via the various auxiliary power conducting means is also audited and controlled in the same manner as is the delivery of power via the various main power distributing means. Otherwise, for purposes of safety from fire initiation, it would be necessary to distribute the auxiliary electric power in mechanically armored conduits.

In attaining the above-identified functions, the main signal conducting means is required to handle numerous different signals at the same time: transmitting such signals back and/or forth between any two or more of numerous spaced-apart locations along the signal conducting means.

Several different techniques permit the substantially simultaneous transmission of numerous different signals along a single signal conducting means (such as an optical fibre), thereby effectively making this single signal conducting means provide-for a plurality of separate and independent communication channels. However, in instant situation, it is necessary not only to provide for such a plurality of separate communication channels, but it is also necessary to make any number of these channels accessible at any one or more locations along the signal conducting means.

In the preferred embodiment, the above-indicated features are attained via a time-multiplexing technique combined with using an optical fibre as the signal conducting means; the operation of which combination is explained via simplified example, as follows.

In an optical fibre, a capacity of 100 separate broadband signal channels are provided-for by dividing time into segments each having a duration of ten milli-seconds, and then by dividing each of these ten-milli-second-long time-segments into 100 time-slots, each having a duration of 100 micro-seconds. Thus, each individual communication channel is represented by a particular one of these hundred-micro-second-long time-slots, repeated once during each ten-milli-second-long time-segment; which is to say that each individual channel may be identified by a number (from 1 to 100) indicating what particular hundred-micro-second-long time-slot it constitutes within each ten-milli-second-long time-segment.

Still more particularly, each given one of the different current sensing means (ex: CSM1) includes electronic information processing means operative to convert the sensed magnitude of its through-flowing current into a commensurately digitally coded signal, and then to deliver this coded signal to the nearby main signal conducting means every ten milli-seconds during its designated hundred-micro-second-long time-slot. Thus, the information regarding the magnitude of the through-flowing current is updated once each ten milli-seconds; which is adequately frequent for most ordinary purposes. Each time after being delivered to the main signal conducting means, this coded signal courses along this main signal conducting means and, within a matter of less than a few micro-seconds after initial delivery, reaches the programmable circuit breaker means (PCBM1) associated with the particular main power conducting means (MPCM1) feeding current through the given one of the different current sensor means (i.e., CSM1).

This programmable circuit breaker means (PCBM1) has been pre-programmed to selectively receive whatever signal is provided during the hundred-micro-second-long time-slot designated to this particular given one of the different current sensor means (CSM1), as well as from each and every one of any other current sensor means (ex: CSM2) subject to current delivered from the particular main power conducting means (MPCM1) associated with this particular programmable circuit breaker means (PCBM1). As additional loads with additional current sensor means are added, the programming of the associated programmable circuit breaker means is correspondingly modified.

Within a given programmable circuit breaker means, the information received from the different associated current sensor means is processed such as to result in a single (digital) signal representing the sum of all the load currents flowing through all the different associated current sensor means; which sum signal is then compared with an internal (digital) signal representing the magnitude of the total current delivered through that given programmable circuit breaker means; which internal signal is derived from the output of a current sensor means built into the given programmable circuit breaker means and operative to sense the magnitude of the total current delivered therethrough. Then, if the comparison shows that the magnitude of the delivered current is larger than that of the sum of the individual load currents, the circuit breaker acts to interrupt the delivery of current.

With respect to the various wall switches and light control means (ex: WS/LCM1), the various remotely controllable electronic ballast means (ex: EBM1), the various telephone receptacle means (ex: TRM1), the various special receptacle means (ex: SRM1), the various signal transceiver means (ex: STM1), etc., each has one or more designated unique time-slots; and each can communicate via the main signal conducting means (ex: MSCM1) (by way of its associated unique time-slot) and thereby with each other as well as with the main private branch exchange (MPBX) as well as with the local telephone company and/or with the auxiliary signal receiving and transmitting means (ASRTM).

An ordinary telephone conversation can readily be carried-on over each one of the hundred-micro-second-long time-slots; which is to say: over each one of the 100 communication channels provided by the above-described time-multiplexing feature. To provide for this type of time-multiplexed telephone conversation, each telephone instrument (ex: TI or CT1) includes the following key elements and features.

(1) Each telephone instrument has a means for converting a continuous audio (or voice) signal into a stream of hundred-micro-second-long bursts of digitized information; which bursts are updated and repeated once each ten milli-seconds. In the preferred embodiment, this conversion is accomplished by: (i) converting the analog audio signal (via an analog-to-digital converter means) into a stream of digitized information with a clock rate of 100 kHz; MHz; (ii) dividing or segregating this stream of digitized information into ten-milli-second-long segments; (iii) directing each such segment into a stepping register clocked at 100 kHz, thereby absorbing that segment into this stepping register; (iv) increasing the clock rate of that stepping register to 10 MHz (after the complete ten-milli-second-long segment has been absorbed), thereby time-compressing each one of these ten-milli-second-long segments to a hundred-micro-second-long burst of "concentrated" digitized audio or voice signal; and (v) once each ten milli-seconds, providing such a burst (at some output terminal means) during a selected one of the 100 separate hundred-micro-second-long time-slots.

(2) Likewise, each telephone instrument has a digital-to-analog conversion means for converting the above-indicated stream of hundred-micro-second-long bursts of digitized information into a continuous voice signal; which process is accomplished in a manner that is completely analogous (in an obverse manner) to the above-described analog-to-digital conversion process.

(3) Also, each (of at least some) of the telephone instruments has a voice-scrambling means operative to make the digitized voice information non-decipherable except by way of a deciphering means having the appropriate algorithm for de-scrambling.

(4) Moreover, each telephone instrument has a means to connect with the main signal conducting means (ex: via MSCM1) (either via a telephone plug or via a wireless transceiver means), and to enter its digitized voice information (in the form of the indicated repeated hundred-micro-second-long bursts) into any chosen one of the 100 separate communication channels (i.e., into any one of the 100 hundred-micro-second-long time-slots). Likewise, each telephone instrument has an obverse-analogous means to receive digitized voice information from any one of the 100 separate communication channels.

(5) Each one individual telephone instrument has a designated communication channel (i.e., a designated hundred-micro-second-long time-slot) via which it may be reached. When so initially reached by a signal from another telephone instrument, this signal conveys information with respect to the designated communication channel of the other telephone instrument (i.e., the equivalent of its extension number); which therefore permits the one telephone instrument to respond by automatically causing its digitized voice output to be entered into the main signal conducting means at the particular time-slot corresponding to that other telephone instrument's designated communication channel.

It is important to recognize that the length of the signal conducting means represents a factor that may affect the quality of this signal communication function. Thus, without making special provisions, the relatively simple above-described communication system and function will only operate properly as long as the length of the main signal conducting means is very short relative to the length of the wave-train associated with the hundred-micro-second-long burts of digitized information; which, with the speed of light being equal to 300,000 kilo-meters per second, means that the length of this wave-train is about 100,000 feet; which further means that the total length of the signal conducting means should not exceed about 1000 feet.

More particularly, with the communication signal traveling along its signal conductor means at about 300,000 km/sec, channel-to-channel interference may result when the transmission time between points amounts to a significant fraction of the duration of one of the hundred-micro-second-long time-slots.

On the other hand, by making each time-slot substantially shorter than 100 micro-seconds in duration, substantially more than 100 time-slots may be accommodated within each ten-milli-second-long time-segment; which, in turn, means that the total number of communication channels may be increased substantially. For instance, making each burst of digitized audio information have a duration of only one micro-second (i.e., making each time-slot only one micro-second long) would permit the signal conducting means to carry 10,000 independent communication channels versus only 100. However, except if making provisions of the type described hereinbelow, using one-micro-second-long time-slots would limit the permissible maximum length of the signal conducting means by a factor of 100 as compared with using hundred-micro-second-long time-slots.

Of course, if more than 100 communication channels were to be required, multiple signal distribution means could be provided for.

Otherwise, it is noted that main private branch exchange MPBX provides, by way of the optical fibre means, the master clock signal necessary to synchronize the operation of the various signal-generating and/or signal-utilizing means.

In situations where it is desirable to have substantially more than 100 separate communication channels and/or to operate over distances far in excess of 1000 feet, the following alternative embodiment is preferable: in which alternatively preferred embodiment each time-segment is only one milli-second long and each time-slot is only one micro-second long; which, in turn, means that a total of 1000 communication channels can be provided for by this alternatively preferred embodiment.

The alternatively preferred embodiment obviates the above-indicated potential channel-to-channel interference by: (i) having the signal conducting means (ex: MSCM1) comprise a looped optical fibre wherein one end of a continuous optical fibre (the start point) originates at the MPBX and the other end of the same continuous optical fibre (the end point) terminates at the MPBX; (ii) having the end point of this continuous optical fibre connected with its start point by way of an electronic digital delay and signal conditioning means (hereinafter referred-to simply as "delay means"); (iii) having the fibre-loop contained in the form of two separate optical fibres located adjacent one another within the main signal conducting means (with the far ends of the two optical fibres optically joined together at the far end of the signal conducting means); (iv) having each one of the various telephone instruments connected at one point in the fibre-loop; (v) having each telephone instrument so connected and arranged that it will enter its signals into the optical fibre in such manner that these signals will travel only in one direction toward the MPBX (which direction is hereinafter defined as "downstream", with the opposite direction being defined as "upstream"), while it will extract signals from the optical fibre as they come from the MPBX and/or from any other points upstream; (vi) having the delay means receive signals from the end point of the fibre-loop and, after a certain time delay, deliver the same signals at a reduced magnitude to the start point; and (viii) having this certain time delay being of such duration as to cause a signal having originated from a given telephone instrument to arrive back to this very same instrument exactly one milli-second later (at a reduced magnitude).

The reason for making the magnitude of the signals entered by the delay means (at the start point of the fibre-loop) substantially lower in magnitude than those signals the delay means receives from the fibre-loop (at its end point) relates to avoidance of potential interference; which potential interference and its avoidance arise as follows: (i) a given telephone instrument will, during each of its designated time-slots, send a freshly updated signal downstream along the optical fibre; (ii) this freshly updated signal will be entered by that given telephone instrument at its particular point of connection with the fibre-loop (i.e., point of entry) at the very time that its previously-entered signal reaches that very point of entry; (iii) by making the (freshly updated) signal then being entered far larger in magnitude than the previously-entered signal just then arriving, this previously-entered signal will in effect be erased (obliterated) by the currently-entered far-larger-in-magnitude signal. Then, as this far-larger-in-magnitude signal passes by other telephone instruments further downstream, or as it reaches the MPBX (i.e., the delay means), the associated downstream points of entry will only detect the most-recently-entered (freshly updated) signal.

Additional Comments Regarding Preferred Embodiments (r) Actually, the total number of useful communication channels in the above-described alternatively preferred embodiment will be less than 1000 by a number that is equal to the duration of an individual time-slot (i.e., one micro-second) divided into the total time delay associated with a signal traveling twice the distance to the telephone instrument located farthermost away from the MPBX. If that distance were to be 10,000 feet, the number of available communication channels would be 980 instead of 1000.

(s) A different approach to implementing the above-described alternatively preferred embodiment involves the use of two separate fibre-loops: one loop for receiving the signals entered by the various telephone instruments and for transmitting these signals downstream toward the MPBX; and one loop for receiving signals from the delay means to transmit these signals to the various telephone instruments. By so using two separate fibre-loops, there will be no need to require of each telephone instrument to receive a relatively weak signal and to emit a much stronger signal.

(t) In the above-described alternatively preferred embodiment, the analogue telephone signal has to be compressed into one-micro-second-long time-slots updated once each millisecond; which implies a degree of "time-compression" of 1000:1 versus only 100:1 for the time-compression associated with the basic preferred embodiment.

(u) A key recognition underlying the invention herein described relates to the fact that the overwhelming percentage of electric power distribution within a building is done for the purpose of lighting, especially so in commercial buildings. Thus, the lighting function becomes the chief determinant of where and how electric power conductors are distributed within a building. By further recognizing that a properly designed telephone signal distribution system can be installed as permanently as can the electric power distribution system without losing any of the required flexibility and that the signal distribution conductors can in fact be safely be laid down alongside the electric power conductors, it becomes clear that doing so provides for substantial overall benefits in the form of reduced installation cost, decreased complexity and increased flexibility.

In particular, the relatively heavy gauge electric power distribution conductors may be reduced in number and total lengths for two basic reasons: (i) load control (such as ON/OFF switching of lights) can be accomplished remotely from the load without actually stringing the electric power conductors to the point of control (i.e., to the wall switch); and (ii) due to increased protection against fire initiation hazards, it becomes feasible to distribute electric power via a single pair of heavy gauge distribution conductors as contrasted with distributing electric power via a multiplicity of pairs of distribution conductors all radiating out from a central power panel.

Thus, in sum total, instant invention relates to the proposition of distributing both electric power and communication signals along a single common main signal and electric power conducting means, branching off along the way from this common main signal and electric power conducting means at whatever points convenient. Thus, instant invention relates to providing in a building the equivalent of what for automobiles has become known as "a single wire power distribution system".

(v) It is anticipated that TV signals as well may be distributed via instant combined signal and electric power distribution system.

(w) As instant invention relates to a combined signal and electric power distribution system and various key features thereof, information on how to accomplish some of the details of these key features has been omitted for sake of brevity and clarity. However, based on the description provided, all the features indicated are readily attainable by a person having ordinary skill in the art pertinent hereto on basis of well known prior art.

For instance, such a person would readily know how to attain the functions associated with the signal transceiver means STM2 installed in suspended ceiling SC and connected with main signal conducting means MSCM1 and alternative power conducting means APCM1; which signal transceiver means is continuously transmitting and receiving on all of the communication channels provided by main signal conducting means MSCM1. Thus, as a person P comes into office OF carrying his own personal cord-less telephone CT1, he is—via receive/transmit antenna RTA2 and signal transceiver means STM2—automatically (i.e., without taking any express log-in action) in contact with his own personally designated communication channel on main signal conducting means MSCM1.

(x) One of the key concepts underlying instant invention is that of using information transmission and processing for keeping accurate track of the flow of electric power, thereby to permit accurate control thereof. As a consequence, any substantive unauthorized power dissipations are detected and prevented, thereby providing for an exceptionally high degree of protection against electrical fire initiation hazards.

In fact, outside of the authorized points of power extraction (ex: lighting fixture LF1), the total power distribution system may be considered as a Class-3 electrical circuit.

(y) It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

I claim:

1. A combined signal and electric power distribution system comprising:

a signal and power distribution center connected with the signal transmission lines of a telephone utility company as well as with the electric power lines of an electric utility company;

a combined signal and power conducting means connected with the signal and power distribution center, and thereby also with said signal transmission lines and electric power lines; the combined signal and power conducting means including a set of signal conductor means as well as a set of main power conductor means; the combined signal and power conducting means being operative to permit, at each of plural connection-points disposed at spaced-apart locations therealong, access operative via a connect means to provide for connection with said signal transmission lines and/or said electric power lines; and plural signal and/or power utilization means, each having a connect means by which it is connected with said combined signal and power conducting means at one of said connection-points.

2. The system of claim 1 wherein said set of signal conductor means and said set of power conductor means are both included within a single tubing-like jacket.

3. The system of claim 1 wherein: (i) the signal and power distribution center includes an auxiliary power supply operative to deliver electric power that is different in some significant parameter from the electric power delivered directly from said electric power lines; and (ii) the signal and power conducting means includes an auxiliary power conductor means connected with said auxiliary power supply.

4. The system of claim 1 wherein: (i) the signal and power distribution center includes an auxiliary power supply operative to deliver electric power even in situations where no power is provided from said electric power lines; and (ii) the signal and power conducting means includes an auxiliary power conductor means connected with said auxiliary power supply.

5. The system of claim 1 wherein said plural signal and/or power utilization means include a lighting fixture.

6. The system of claim 5 wherein said lighting fixture is connected, via a connect means, both with the set of signal conductor means as well as with the set of main power conductor means.

7. The system of claim 6 wherein said lighting fixture: (i) is mounted in a ceiling of a room in a building; and (ii) includes a signal transceiver means connected with said set of signal conductor means; the signal transceiver means having a receive/transmit antenna and being operative to communicate with a cordless telephone located within the room.

8. The system of claim 6 wherein said lighting fixture includes signal-responsive adjust means connected with the signal conductor means and operative, in response to a control signal provided from the signal conductor means, to adjust the amount of light provided from the lighting fixture.

9. The system of claim 6 wherein said plural signal and/or power utilization means additionally include a telephone instrument connected with the set of signal conductor means.

10. The system of claim 6 wherein said plural signal and/or power utilization means include a lighting control means connected with said set of signal conductor means and operative therethrough to control the light output of the lighting fixture.

11. The system of claim 1 wherein said set of signal conductor means includes optical fibre means, thereby providing for substantial electromagnetic isolation between said main power conductor means and said signal conductor means.

12. The system of claim 11 wherein the optical fibre means includes a continuous loop of optical fibre; said continuous loop of optical fibre starting and ending at said signal and power distribution center.

13. The system of claim 1 wherein said signal and power distribution center includes a telephone signal processing means connected in circuit with said signal transmission lines as well as with said set of signal conductor means.

14. The system of claim 13 wherein said signal processing means includes a signal delay means.

15. The system of claim 13 wherein: (i) said set of signal conductor means includes optical fibre means; and (ii) said signal processing means includes an opto-electronic conversion means operative to convert an optical signal to an electronic signal and/or vice versa.

16. The system of claim 1 wherein: (i) a branch conduction means is connected with said combined signal and power conducting means; (ii) the branch conduction means includes a second set of signal conductor means as well as a second set of power conductor means; and (iii) a plurality of signal and/or load utilization means is connected with the branch conduction means at various spaced-apart locations therealong.

17. The system of claim 1 wherein: (i) the signal and power distribution center includes an auxiliary power supply means operative to deliver electric power even in situations where no power is delivered from said electric power lines; (ii) the combined signal and power conducting means includes a set of auxiliary power conductor means connected with the auxiliary power supply means; (iii) said plural signal and/or power utilization means includes a lighting fixture connected with said main power conductor means as well as with said auxiliary power conductor means; and (iv) the lighting fixture includes means operative to draw power from said auxiliary power conductor means, and thereby from said auxiliary power supply means, during periods when power ceases to be provided from said electric power lines.

18. The system of claim 17 wherein (i) the lighting fixture includes adjust means operative, in response to receiving an adjust signal at an adjust input, to adjust the amount of light provided therefrom; (ii) the adjust input is connected with said signal conductor means;

and (iii) a lighting control means is connected with said signal conductor means and is operable to provide said adjust signal, thereby to effect control of the amount of light provided.

19. The system of claim 18 wherein said lighting control means is located remotely from the lighting fixture.

20. The system of claim 1 wherein: (i) a main circuit breaker means is connected with the main power conductor means as well as with the signal conductor means; (ii) the main circuit breaker means is operative, in response to receiving an actuation signal at an actuation input, to interrupt the flow of current in the main power conductor means; (iii) the main circuit breaker means includes a current sensing means operative to sense the magnitude of the current flowing in the main power conductor means and to generate a main measure commensurate with that magnitude; (iv) each one of said power utilization means has a load current sensor means operative to sense the magnitude of the current drawn by it from the main power conductor means and to generate a load current signal representative of that magnitude; (v) each of said load current sensor means is connected with the signal conductor means and operative to impart its associated load current signal thereonto; (vi) the main circuit breaker means also includes a signal processing means connected with the signal conductor means and operative to receive therefrom all the load current signals and to derive from these signals a total measure representative of the magnitude of the total current drawn by all the load utilization means; and (vii) the signal processing means is operative to provide said actuation signal to said actuation input in the event that the total measure, as compared with the main measure, indicates that the magnitude of the total load current significantly exceeds the magnitude of the main current, thereby causing the main circuit breaker means to interrupt the flow of current in the main power conductor means.

21. The system of claim 1 wherein the signal and power distribution center is characterized by including an electric storage battery means operative to be charged by power derived from the electric power lines.

22. The system of claim 21 wherein: (i) the combined signal and power conducting means additionally includes a set of auxiliary power conductor means; (ii) the signal and power distribution center additionally includes a voltage conditioning means connected with the electric storage battery means and operative to provide an auxiliary AC voltage at an auxiliary output; and (iii) the auxiliary power conductor means is connected with this auxiliary output.

23. In a building, a combined signal and electric power distribution system comprising:
a central signal/power distribution means including: (i) a signal processing means having a signal input-/output terminal means; and (ii) a main power distribution panel having a main power output terminal means at which is provided ordinary AC power line voltage;
plural spaced-apart signal/power utilization means; each signal/power utilization means having: (i) a signal utilizing means operative to generate and/or use a signal; (ii) a load means operative to utilize electric power; and (iii) a connect means; and
a combined signal/power transmission line having: (i) a set of signal conductor means connected with the signal input/output terminal means; and (ii) a set of main power conductor means connected with the power output terminal means;
the combined signal/power transmission line extending from the central signal/power distribution means to each of the plural spaced-apart signal/-power utilization means;
each of the plural signal/power utilization means being connected, via its associated connect means, with the signal conductor means and the main power conductor means.

24. The system of claim 23 wherein a lighting fixture is included among said plural signal/power utilization means.

25. The system of claim 24 wherein the lighting fixture includes a control means connected with the signal conductor means and, in response to a control signal received therefrom, operative to control the amount of light provided from the lighting fixture.

26. The system of claim 24 wherein the lighting fixture includes a signal transceiver means connected with the signal conductor means and operative, by way of a receive/transmit antenna, to convey signals between the signal conductor means and a cordless telephone instrument located nearby.

27. The system of claim 23 wherein: (i) the central signal/power distribution means additionally includes an auxiliary power supply means operative to provide auxiliary electric power at an auxiliary power output; and (ii) the combined signal/power transmission line additionally includes an auxiliary power conductor means, which is connected with the auxiliary power output.

28. The system of claim 23 wherein: (i) a main circuit breaker means is disposed between the central signal/-power distribution means and the combined signal/-power transmission line; (ii) the main circuit breaker means is connected with the signal conductor means as well as with the main power conductor means; (iii) the main circuit breaker means is operative, in response to receiving an actuation signal, to interrupt the current delivered to the main power conductor means; (iv) each signal/power utilization means includes a current-sensing means operative to generate a signal commensurate with the magnitude of the current drawn by its associated load means and to convey this signal to the main circuit breaker means via the signal conductor means; (v) the main circuit breaker means includes a signal processing means operative to generate a reference signal commensurate with the magnitude of the current flowing through the circuit breaker means as well as to generate a composite signal from each of the individual signals received from the plural current-sensing means; and (vi) the information processing means is operative to compare the composite signal with the reference signal and to provide said actuation signal in the event that the magnitude of the current flowing through the circuit breaker means were to be substantially larger than the sum of the magnitudes of all the currents drawn by all the plural load means.

29. In a building having plural rooms, a combined signal and electric power distribution system comprising:
central signal/power processing and distribution means including: (i) central signal processing means operative to receive and deliver signals at a signal input/output terminal means; and (ii) central power distribution panel connected with an electric utility power line and operative to provide ordinary AC power line voltage at a main power output terminal means;

plural signal/power utilization means; each signal/power utilization means having: (i) a signal utilizing means operative to generate and/or to use a signal; (ii) a power utilizing means operative to use electric power; and (iii) a connect means; and a combined signal/power transmission line having: (i) a set of signal conductor means connected with the input/output terminal means; and (ii) a set of main power conductor means connected with the power output terminal means;

the signal/power transmission line extending to each of the plural signal/power utilization means; each if which being connected with the combined signal/power transmission line by way of its connect means.

30. The system of claim 29 wherein at least one of the plural signal/power utilization means includes a receptacle means: (i) operative to receive and hold an ordinary electric power plug; and (ii) characterized by having built-in sensor means operative to sense the magnitude of any current being drawn from said receptacle means and to provide to the signal conductor means a signal indicative of this magnitude.

31. The system of claim 29 wherein the plural signal/power utilization means include a lighting fixture.

32. The system of claim 31 wherein the plural signal/power utilization means also include a telephone instrument.

33. The system of claim 29 wherein: (i) the combined signal/power transmission line includes a continuous optical fibre means having an input end and an output end; and (ii) the input end and the output end are both connected with the central signal processing means.

34. The system of claim 29 wherein: (i) the signal input/output terminal means includes a signal input port and a signal output port; (ii) the signal conductor means has an input end connected with said output port and an output end connected with said input port; and (iii) the signal processing means is operative to receive a first signal from the output end and to deliver a second signal to the input end, which second signal represents the same information as does the first signal, but is delayed in time by a predetermined substantial amount with respect to the first signal.

35. The system of claim 29 wherein: (i) the signal input/output terminal means includes a signal input port and a signal output port; (ii) the signal conductor means has an input end connected with said output port and an output end connected with said input port; and (iii) the signal processing means is operative to generate a clock signal and to deliver this clock signal to the input end, thereby to provide a synchronizing signal to each of the plural signal/power utilization means.

36. The system of claim 35 wherein the signal processing means is connected with the telephone lines of an ordinary telephone utility company.

37. The system of claim 29 wherein said combined signal/power transmission line is operative to deliver signals as well as electric power to several of said plural rooms.

38. The system of claim 29 wherein each of the plural signal/power utilization means includes a means to supply a signal to the signal conductor means.

39. The system of claim 29 wherein: (i) the central signal/power processing and distribution center additionally includes an auxiliary power supply means operative to provide an auxiliary voltage at an auxiliary power output; (ii) the combined signal/power transmission line additionally includes an auxiliary power conductor means, which is connected with said auxiliary power output; and (iii) at least one of the plural signal/power utilization means is connected with the auxiliary power conductor means and is operable to receive power therefrom.

40. The system of claim 39 wherein said at last one signal/power utilization means is a telephone instrument.

41. The system of claim 29 wherein the central power distribution panel is characterized by being connected with the signal conducting means and by being operative to receive signals therefrom.

42. In a building having plural rooms, a lighting and signal-distribution/processing system comprising:

a combination power source and information processing entity having a main power output, a main signal input port, and a main signal output port; an AC voltage from an ordinary electric utility power line being provided at the main power output; a signal processing means being connected between the main signal input port and the main signal output port;

plural lighting fixtures, each having connect means; and a combined signal/power transmission cable extending to each of the lighting fixtures and including a power conductor means and a signal conductor means; each lighting fixture being connected with the combined signal/power transmission cable by way of its connect means; the signal conductor means having an input end connected with the main signal output port and an output end connected with the main signal input port; the power conductor means being connected with the main power output;

whereby the lighting fixtures are powered via the power conductor means and controlled, as to their light output, by way the signal conductor means.

43. The system of claim 42 combined with plural telephone instruments, each connected with the main signal input port via the signal conductor means.

44. The system of claim 42 combined with a power receptacle operable to receive and hold an ordinary electric power plug; the power receptacle being connected both with the power conductor means and the signal conductor means.

45. The system of claim 42 wherein: (i) the combination power source and information processing entity includes an auxiliary power supply operable to provide auxiliary electric power at an auxiliary power output even during periods when no power is being supplied by the electric utility power line; (ii) the combined signal/power transmission cable includes an auxiliary power conductor means connected with said auxiliary power output; (iii) a receptacle means is connected with the auxiliary power conductor means as well as with the signal conductor means; and (iv) this receptacle means has a first receptable means operable to receive and hold a telephone plug means as well as a second receptacle means operable to receive and hold a special power plug means.

46. The system of claim 42 wherein: (i) a first signal is provided from the output end to the main signal input port; (ii) a second signal is provided from the main output port to the input end; and (iii) the second signal representing the same information as does the first signal, except for being delayed in time by a substantial amount.

47. The system of claim 46 wherein the signal processing means is operative to supply a clock signal at the main signal output port and thereby to the signal conductor means.

48. The system of claim 42 wherein the signal processing means is connected with the telephone lines of a telephone utility company.

49. The system of claim 42 wherein the signal processing means is connected with an auxiliary signal receiving and transmitting means.

50. The system of claim 42 wherein the signal conductor means comprises at least two signal conductors: one for carrying signals in one direction, and one for carrying signals in the opposite direction.

51. The system of claim 42 wherein: (i) the combination power source and information processing entity includes an auxiliary power supply operable to provide auxiliary electric power at an auxiliary power output even during periods when no power is being supplied by the electric utility power line; (ii) the combined signal/power transmission cable includes an auxiliary power conductor means connected with said auxiliary power output; (iii) one of the rooms has a ceiling; (iv) a signal transceiver means has a receive/transmit antenna mounted at or near the ceiling; (v) the signal processing means is connected with the telephone lines of a telephone utility company; and (vi) the signal transceiver means is connected with the signal conductor means as well as with the auxiliary power conductor means;

whereby a person in the room may make and/or receive telephone calls via a cordless telephone instrument.

52. The system of claim 42 wherein: (i) one of the rooms has a ceiling; (ii) a signal transceiver means is connected with the signal conductor means and has a receive/transmit antenna mounted at or near the ceiling; and (iii) the signal processing means is connected with the telephone lines of a telephone utility company;

the system being so arranged that a person in the room may make and/or receive telephone calls via a cordless telephone instrument.

53. The system of claim 42 wherein: (i) a signal transceiver means is connected with the signal conductor means and has a receive/transmit antenna located within one of the rooms; and (ii) the signal processing means is connected with the telephone lines of a telephone utility company;

the system being so adapted as to permit a person within the room to make and/or receive telephone calls via a cordless telephone instrument.

54. The system of claim 42 wherein: (i) the combination power source and information processing entity includes an auxiliary power supply operable to provide auxiliary electric power at an auxiliary power output even during periods when no power is being supplied by the electric utility power line; (ii) the combined signal/power transmission cable includes an auxiliary power conductor means connected with said auxiliary power output; and (iii) at least one of the lighting fixtures is connected with the auxiliary power conductor means.

55. A power distribution system comprising:

a source means operative to provide at a pair of main output terminals a power line voltage from an electric utility power line; the source means including a circuit breaker means operative, a brief period after having received an actuation signal at an actuation input, to stop any flow of current from the main output terminals;

cable means having a pair of main power conductors connected with the main output terminals; and plural loads disposed at spaced-apart locations along the cable means; each load being connected across the main power conductors by way of a current sensing means; each current sensing means being operative to produce a signal output commensurate with the magnitude of the current drawn by its associated load means; and communication means connected in circuit between each current sensing means and the actuation input; the communication means being operative to convey information from each current sensing means to the actuation input in regard to the magnitude of the current drawn by each load;

whereby the actuation signal will be provided if at any time substantially more current were to flow from the main output terminals than were drawn by all the plural loads in combination.

56. The system of claim 55 wherein no more power than about 100 Watt may be drawn from the main power conductors except by one or more of the plural loads.

57. The system of claim 55 wherein the cable means includes a signal conductor means connected in circuit between the actuation input and at least one of the current sensing means.

58. The system of claim 57 wherein the signal conductor means is additionally connected in circuit with the telephone lines of a telephone utility company.

59. The system of claim 55 wherein the plural loads include a lighting fixture.

60. The system of claim 55 wherein the source means is characterized by including an auxiliary energy source operative to deliver electric power even during periods when no electric power is available from the electric utility power line.

* * * * *